United States Patent
Niemelä et al.

(10) Patent No.: US 8,665,807 B2
(45) Date of Patent: Mar. 4, 2014

(54) METHOD AND APPARATUS FOR PROVIDING HIGH BANDWIDTH UTILIZATION

(75) Inventors: Kari Juhani Niemelä, Oulu (FI); Jari Yrjänä Hulkkonen, Oulu (FI)

(73) Assignee: Nokia Corporation, Espoo (FI)

( * ) Notice: Subject to any disclaimer, the term of this patent is extended or adjusted under 35 U.S.C. 154(b) by 641 days.

(21) Appl. No.: 12/593,354

(22) PCT Filed: Mar. 26, 2008

(86) PCT No.: PCT/IB2008/000718
§ 371 (c)(1),
(2), (4) Date: May 25, 2010

(87) PCT Pub. No.: WO2008/117168
PCT Pub. Date: Oct. 2, 2008

(65) Prior Publication Data
US 2010/0284349 A1 Nov. 11, 2010

Related U.S. Application Data

(60) Provisional application No. 60/908,090, filed on Mar. 26, 2007.

(51) Int. Cl.
*H04W 4/00* (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

| | | | |
|---|---|---|---|
| 5,848,060 A | 12/1998 | Dent | |
| 7,616,606 B2 * | 11/2009 | Gerhardt et al. | 370/329 |
| 7,808,964 B2 | 10/2010 | Piirainen et al. | |
| 2005/0036571 A1 * | 2/2005 | Shvodian et al. | 375/316 |
| 2006/0019701 A1 | 1/2006 | Ji | |
| 2006/0258386 A1 * | 11/2006 | Jeong et al. | 455/525 |
| 2007/0042778 A1 * | 2/2007 | Keller et al. | 455/443 |
| 2008/0014877 A1 | 1/2008 | Hulkkonen et al. | |
| 2009/0010219 A1 * | 1/2009 | Lee et al. | 370/329 |

FOREIGN PATENT DOCUMENTS

WO 2006020653 A1 2/2006

OTHER PUBLICATIONS

International Search Report and Written Opinion of the International Searching Authority for PCT Application No. PCT/IB2008/000718, dated Sep. 22, 2008, 13 pages.
International Search Report and Written Opinion of the International Searching Authority for PCT Application No. PCT/IB2008/00078, dated Sep. 22, 2008, 13 pages.

(Continued)

*Primary Examiner* — Kenny Lin
(74) *Attorney, Agent, or Firm* — Harrington & Smith

(57) ABSTRACT

An approach is provided for allocating bandwidth among a plurality of bandwidths for providing communication over a radio network. The radio network utilizes a plurality of cells. Different values of center carrier frequencies are assigned corresponding to the cells, wherein the different values are set to vary frequency reuse over the allocated bandwidth.

17 Claims, 13 Drawing Sheets

(56) References Cited

OTHER PUBLICATIONS

"$3^{rd}$ Generation Partnership Project; Technical Specification Group Services and System Aspects; 3GPP System Architecture Evolution: Report on Technical Options and Conclusions (Release 8)", 3GPP TR 23.882 V8.0.0, Sep. 2008, 234 pgs.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813 V7.0.0, Jun. 2006, 39 pgs.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V.8.3.0, Dec. 2007, 121 pgs.

\* cited by examiner

METHOD AND APPARATUS FOR PROVIDING HIGH BANDWIDTH UTILIZATION

RELATED APPLICATION

This application was originally filed as PCT Application No. PCT/IB2008/000718 on Mar. 26, 2008 and claims priority to U.S. Provisional Application No. 60/908,090 filed on Mar. 26, 2007, which is incorporated herein by reference in its entirety.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves bandwidth allocation and frequency reuse (i.e., ability to use the same frequency within a radio communication system). Traditionally, spectral efficiency has been compromised for reduced complexity in allocating bandwidth and deploying frequency reuse schemes.

SOME EXEMPLARY EMBODIMENTS

Therefore, there is a need for an approach for providing efficient bandwidth allocation.

According to one embodiment of the invention, a method comprises allocating bandwidth among a plurality of bandwidths for providing communication over a radio network, wherein the radio network utilizes a plurality of cells. The method also comprises assigning different values of center carrier frequencies corresponding to the cells, wherein the different values are set to vary frequency reuse over the allocated bandwidth.

According to another embodiment of the invention, an apparatus comprises logic configured to allocate bandwidth among a plurality of bandwidths for providing communication over a radio network, wherein the radio network utilizes a plurality of cells. The logic is further configured to assign different values of center carrier frequencies corresponding to the cells, wherein the different values are set to vary frequency reuse over the allocated bandwidth.

According to another embodiment of the invention, a method comprises transmitting within one of a plurality of cells of a radio network, wherein the cells are grouped according to a frequency reuse scheme that assigns different values of center carrier frequencies for the respective groups, wherein the different values are set to vary frequency reuse over an allocated bandwidth within the radio network.

According to yet another embodiment of the invention, an apparatus comprises a transceiver configured to transmit within one of a plurality of cells of a radio network, wherein the cells are grouped according to a frequency reuse scheme that assigns different values of center carrier frequencies for the respective groups. The different values are set to vary frequency reuse over an allocated bandwidth within the radio network.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing bandwidth allocation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
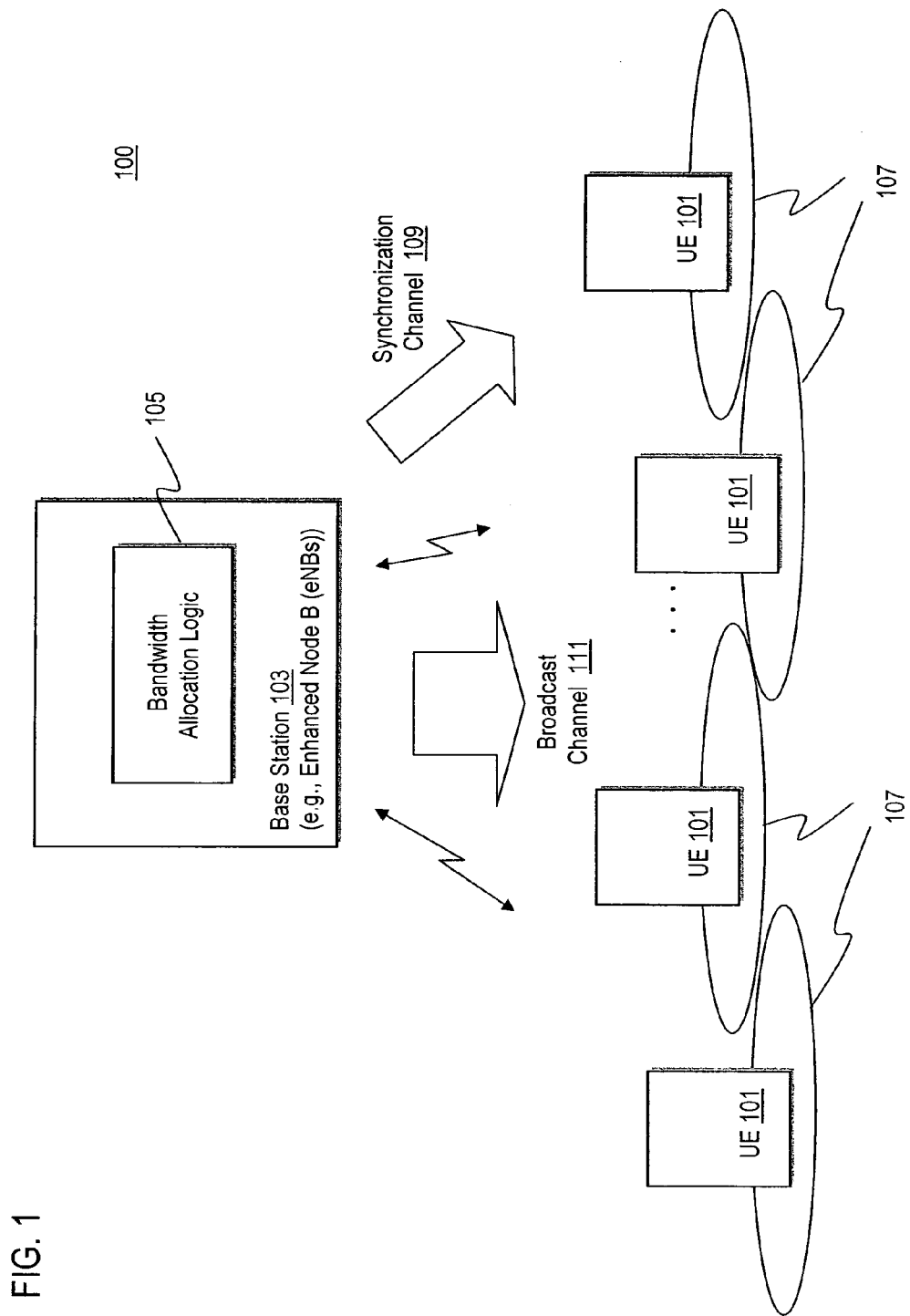
FIG. 1 is a diagram of a communication system capable of performing frequency reuse, according to an embodiment of the invention.

FIG. 1 is a diagram of a communication system capable of performing frequency reuse, according to an embodiment of the invention. As shown, in communication system 100, one or more user equipment (UE) 101 communicate with a base station 103, which is part of an access network (e.g., WiMAX (Worldwide Interoperability for Microwave Access), Third Generation Partnership Project (3GPP) Long Term Evolution (LTE), etc.). Under the 3GPP LTE architecture, the base station 103 denoted as an enhanced Node B (eNB) includes bandwidth allocation logic 105. The UE 101 can be any type of mobile stations, such as handsets, terminals, stations, units, devices, or any type of interface to the user (such as "wearable" circuitry, etc.). Under this scenario, the UEs 101 are served by different cells 107. The UE 101 includes a transceiver (not shown) and an antenna system (not shown) that couples to the transceiver to receive or transmit signals from the base station 103; the antenna system can include one or more antennas.

As with the UE 101, the base station 103 employs a transceiver (not shown), which transmits information to the UE 101. Also, the base station 103 can employ one or more antennas for transmitting and receiving electromagnetic signals. For instance, the Node B 103 may utilize a Multiple Input Multiple Output (MIMO) antenna system, whereby the Node B 103 can support multiple antenna transmit and receive capabilities. This arrangement can support the parallel transmission of independent data streams to achieve high data rates between the UEs 101 and Node B 103.

The Node B 103 and the UE 101 can communicate using Wideband Code Division Multiple Access (WCDMA), Orthogonal Frequency Division Multiplexing (OFDM) or Single Carrier Frequency Division Multiple Access (FDMA) (SC-FDMA). In an exemplary embodiment, both the uplink (from the UE 101 to the network) and the downlink (from the network to the UE 101) can utilize WCDMA.

It is recognized that the LTE architecture employs multiple bandwidths-which are provided, for instance, in increments of 1:2 (i.e. 1.25, 2.5, 5, 10, (15) and 20 MHz). For example, if an operator (or service provider) has bandwidth available that is not properly assigned according to the given LTE bandwidths, this causes reduction in spectral efficiency (which can even be halved under certain circumstances).

Traditionally, LTE systems employ a frequency reuse of 1. Instead of using frequency reuse of 1, where center carrier frequency is the same or spaced by multiples of the LTE bandwidth, the center carrier frequency, in an exemplary embodiment, is allocated in variable increments. For example, the increments can be 180 KHz or 200 KHz, so that transmissions are not fully, but partially overlapped. This approach can produce bandwidth utilization between 1.25 MHz to two times the maximum bandwidth utilization of the traditional LTE approach.

As will be later explained, the bandwidth allocations are frequency offset based on the center carrier frequencies to minimize the overlap. This offset information can be signaled, for example, from the base station 103 to one or more of the UEs 101 over a control channel, such as a synchronization channel (SCH) 109. Alternatively, this offset information can be broadcast to the all the UEs 101 over a broadcast channel (BCH) 111.

The effectively higher reuse can maintain about the same spectral efficiency as with reuse 1, because higher order modulations or multiple input multiple output (MIMO) can be beneficially used on that less overlapping part of the spectrum. The average gain in spectral efficiency can be about 50% (shown in FIG. 5). Furthermore, a load balancing mechanism can be provided, e.g., when sectors are unevenly loaded the most loaded sector may use less re-used spectrum.

Figure 2A:
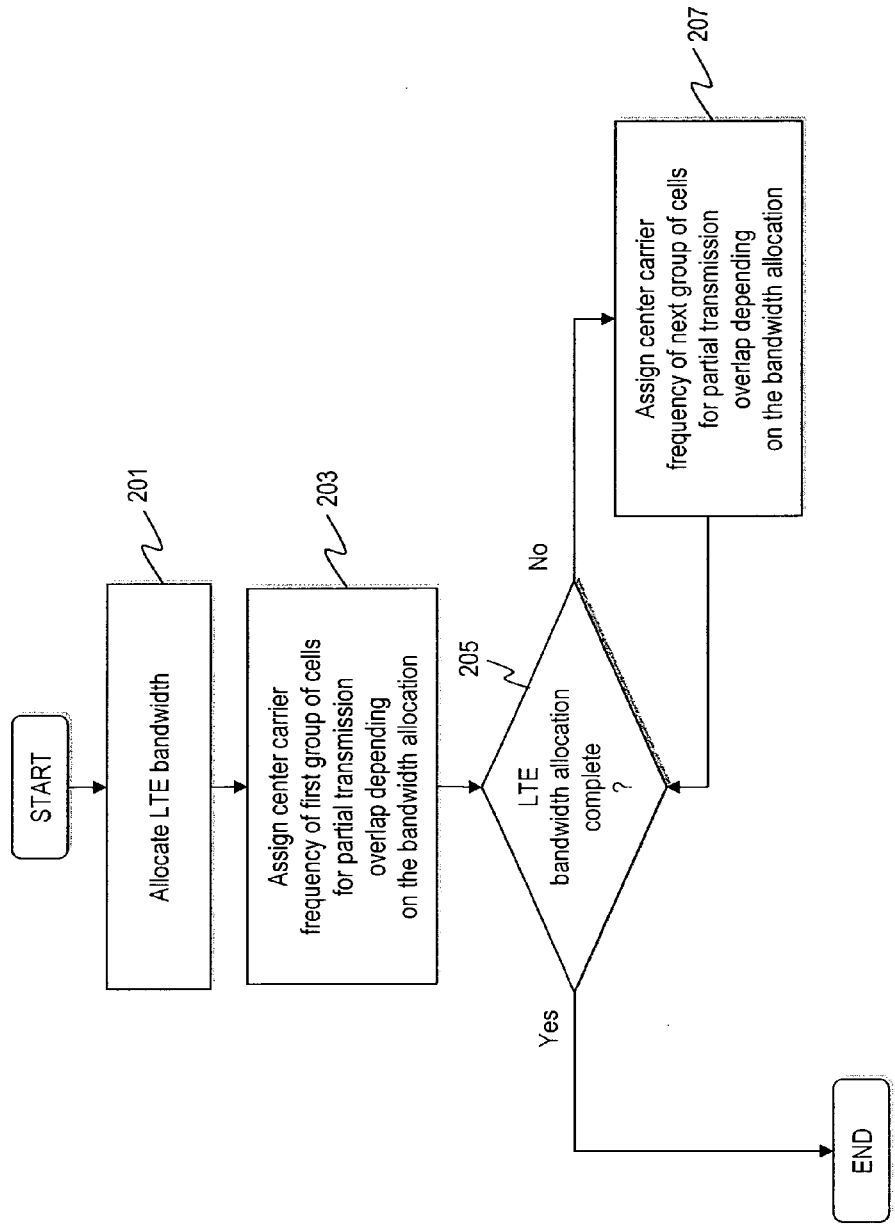
FIGS. 2A and 2B are flowcharts of a process for resource allocation in support of variable frequency reuse, and a process for determining frequency offset for the allocation, respectively, according to various embodiments of the invention.
Figure 2B:
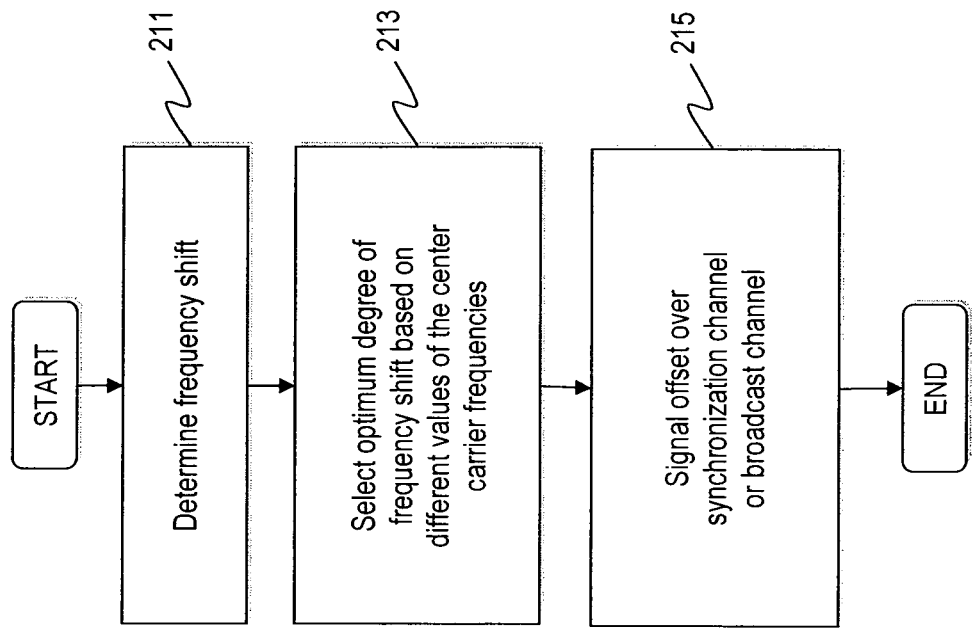

FIGS. 2A and 2B are flowcharts of a process for resource allocation in support of variable frequency reuse, and a process for determining frequency offset for the allocation, respectively, according to various embodiments of the invention. As an LTE system, the system 100 can be configured to re-farm, e.g., in GSM (Global System for Mobile Communications) frequencies. This approach is particularly desirable as spectral efficiency plays an important role under the LTE architecture. It is noted that spectral efficiency should remain high even with partial deployment, i.e., to co-exist with GSM—which time period may be long.

Figure 4:
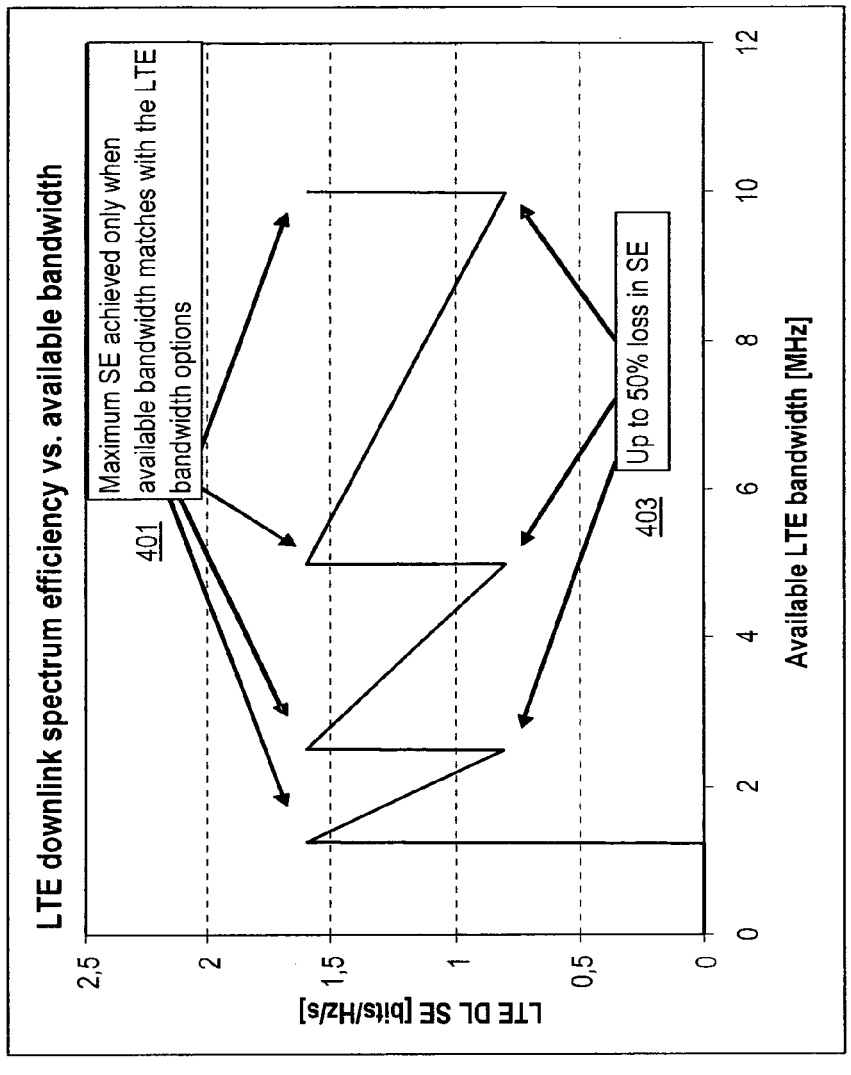
FIG. 4 is a graph showing spectral efficiency versus available bandwidth for a traditional frequency reuse scheme.

As mentioned, instead of using frequency reuse of 1, where center carrier frequency is the same or spaced by in multiples of the applied LTE bandwidth, the center carrier frequency can be allocated, e.g., in steps of 180 or 200 KHz, as to partially overlap. This provides a network level reuse from 1 to 2 depending on the allocated band. Consequently, reuse can vary over the allocated bandwidth, as shown in FIG. 4.

As shown in FIG. 2A, LTE bandwidth is allocated, as in step 201, to the UEs 101 across the various cells. The process effectively groups (or classifies) the cells for frequency assignment. In step 203, the process assigns a center carrier frequency of a first group of cells for partial transmission overlap, depending on the bandwidth allocation. This process is repeated for all groups until all cells are appropriately assigned. Accordingly, if LTE bandwidth allocation is not complete, as determined in step 205, the process assigns another center carrier frequency to the next group of cells for partial transmission overlap (per step 207).

Moreover, guard bands can be utilized, if border frequencies of LTE allocation are used only for some cells to minimize intersystem interference (i.e., soft guard band towards GERAN (GSM EDGE Radio Access Network) can be provided). Also, uneven loading of cells can be managed—i.e. with better signal quality (e.g., C/I) for MIMO to operate; alternatively higher order modulation schemes can be used.

As shown in FIG. 2B, a process is introduced to provide an optimal degree of frequency shift or offset. In step 211, a frequency shift is determined. Next, the optimal degree of frequency shift is selected based on the assigned values of the center carrier frequencies, as in step 213. According to one embodiment, the degree is considered "optimal" if the total system bandwidth is covered and the overlap is minimized. It is contemplated that other parameters and factors can be used to determine what is "optimal"—e.g., minimal interference, etc. In step 215, the offset can be signalled over the synchronization channel 109 or the broadcast channel 111.

Figure 3A:
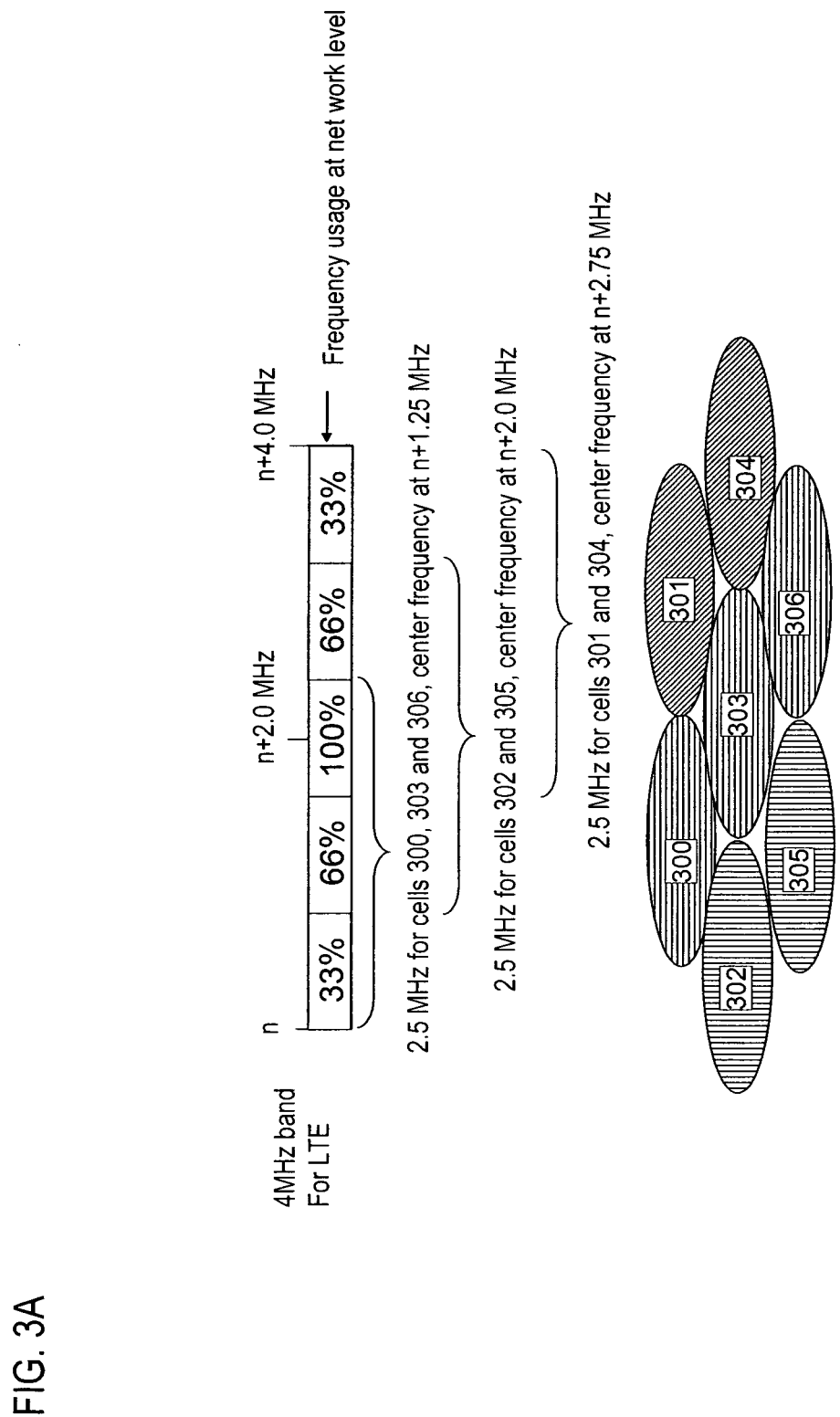
FIG. 3A is a diagram of an exemplary reuse variation within an allocated bandwidth, according to an embodiment of the invention.

FIG. 3A is a diagram of an exemplary reuse variation within an allocated bandwidth, according to an embodiment of the invention. For the purposes of illustration, this example involves three sectors with 2.5 MHz LTE bandwidth each are used to fill a 4 MHz bandwidth allocation. Also, equal carrier spacing is assumed so as to provide even distribution is then 0.75 MHz. In this manner, a center frequency of n+1.25 MHz for a first group of cells 300, 303, and 306. The second group of cells 302 and 305 is assigned a center frequency of n+2.0 MHz. Further, the third group of cells 301 and 304 are provided with a center frequency of n+2.75 MHz.

According to one embodiment, to support fast radio resource management (RRM) algorithms (e.g., resource allocation), the spacing of carriers can be multiple of resource blocks—e.g., 180 kHz resource block offset (RBO). Carrier spacings and location of carriers can thus be optimized according to uneven load of cells, e.g., offering higher C/I (carrier to interference ratio) to some part of the spectrum to carry more traffic with MIMO or higher order modulations.

Figure 3B:
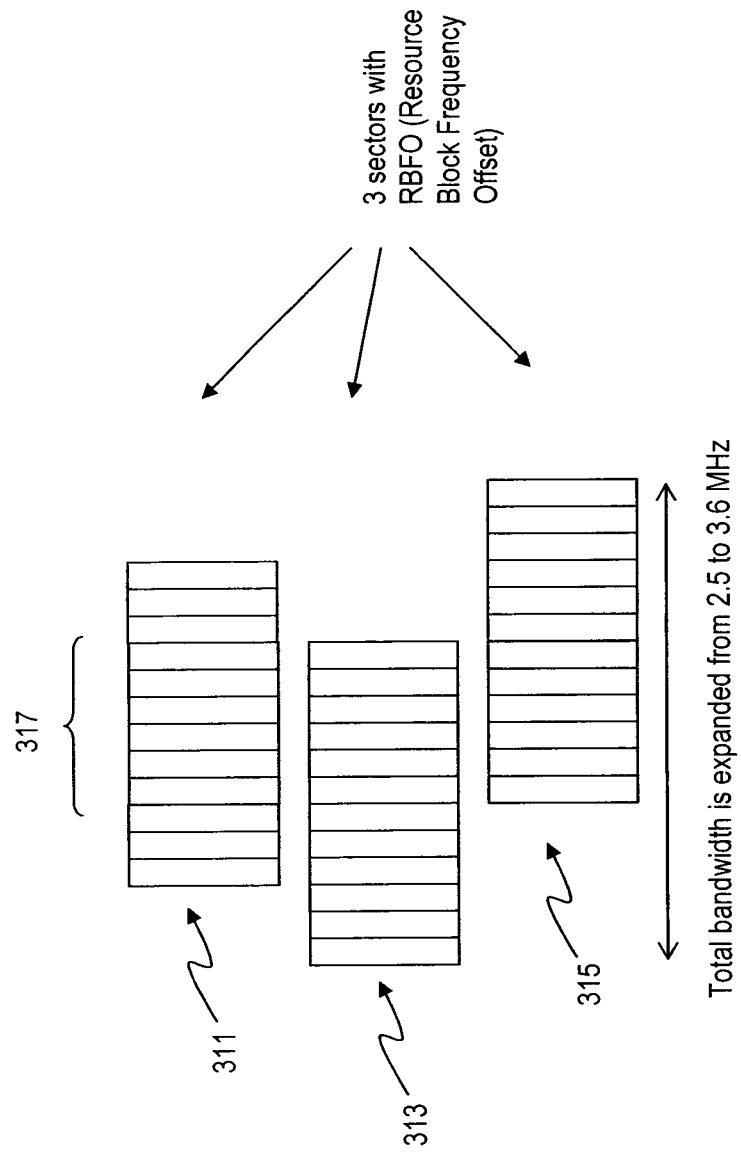
FIG. 3B is a diagram of exemplary offsets for cell sectors in a radio network, according to an embodiment of the invention.

FIG. 3B is a diagram of exemplary offsets for cell sectors in a radio network, according to an embodiment of the invention. As seen, the bandwidth allocations 311-315 possess an area of frequency overlap 317. In this example, the total bandwidth is increased from 2.5 MHz to 3.6 MHz. If a synchronization channel (SCH), e.g., channel 109 in system 100, needs to be received without offset to support, for instance, intra-frequency mobility, that synchronization channel may need to be sent at an opposite offset to make it effectively unshifted. The synchronization channel 109 can be arranged according to intra-frequency mobility conditions irrespective of the frequency offset for the center frequency.

In addition to this opposite shift, the used offset can be signaled in the SCH 109—e.g., together with the cell identifier (ID) or that offset is signaled in a broadcast channel (BCH) 111 or other common channels that may need to be partly sent with a similar opposite offset. In order to enlarge the possible offset in the narrowest bandwidths, the SCH 109 or BCH 111 maybe narrowed, for example, from 6 resource block (RB) to lower values.

FIG. 4 is a graph showing spectral efficiency versus available bandwidth for a traditional frequency reuse scheme. In this graph 400, spectral efficiency is maximized at points 401. In this traditional approach, multiple bandwidths are provided in increments of 1:2—i.e., 1.25, 2.5, 5, 10, (15) and 20 MHz. As noted, if the network has bandwidth available that does not utilize the full LTE bandwidths, the system experiences reduction in spectral efficiency—e.g., up to a 50% reduction (points 403).

Figure 5:
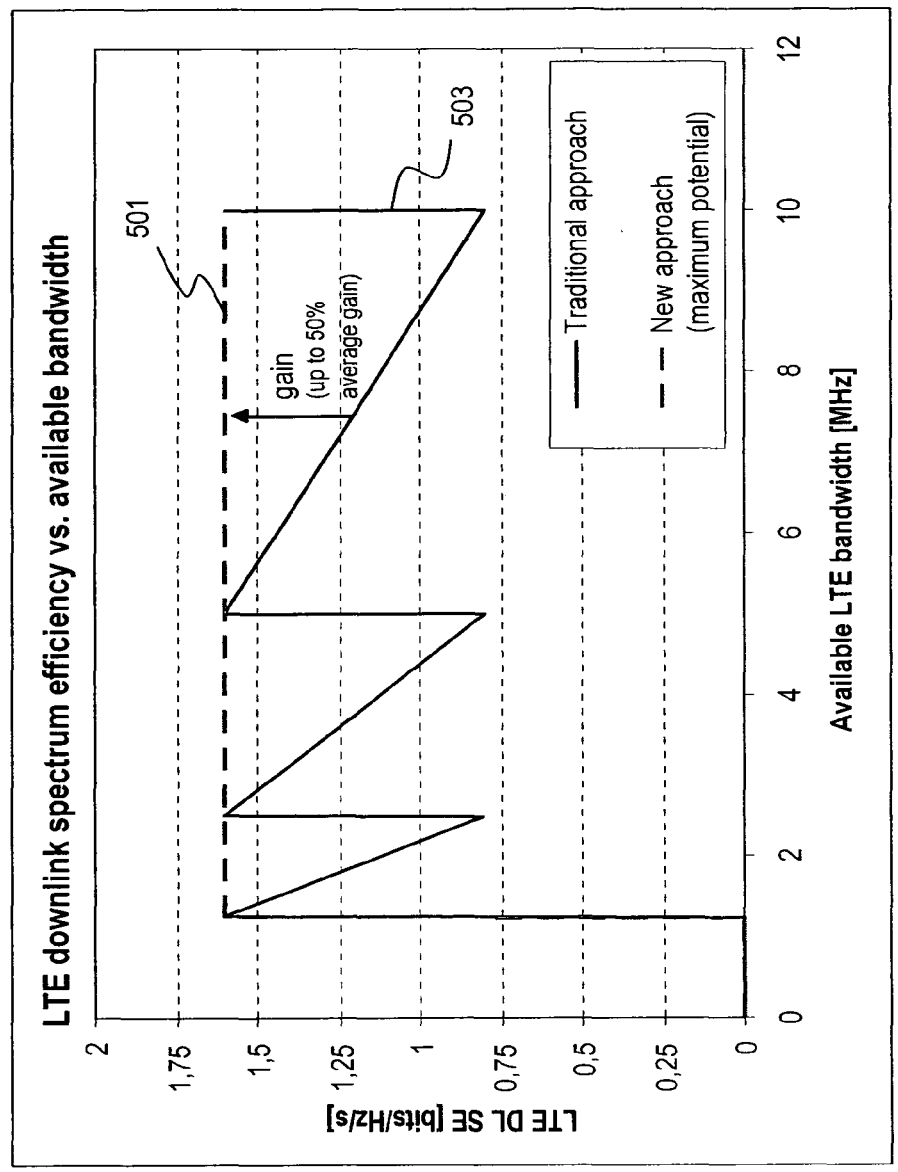
FIG. 5 is a graph showing spectral efficiency versus available bandwidth for the frequency reuse scheme of FIGS. 2A and 2B.

FIG. 5 is a graph showing spectral efficiency versus available bandwidth for the frequency reuse scheme of FIGS. 2A and 2B. In contrast to the approach of FIG. 4, graph 500 shows the result of the approach of FIGS. 2A and 2B, which enables complete bandwidth filling between 1.25 to 2 times of maximum bandwidth of LTE, independent of the allocated bandwidth. Dashed line 501 represents the spectrum efficient of the processes of FIGS. 2A and 2B, while the solid line 503 is that of a traditional approach. Thus, with the complete bandwidth utilization approach, up to 100% spectral efficiency gain can be obtained.

By way of example, the above processes utilize an architecture compliant with the UMTS terrestrial radio access network (UTRAN) or Evolved UTRAN (E-UTRAN) in 3GPP. This architecture is more fully described below with respect to FIGS. 6A-6D.

FIGS. 6A-6D are diagrams of communication systems having exemplary long-term evolution (LTE) architectures, in which the user equipment (UE) and the base station of FIG. 1 can operate, according to various exemplary embodiments of the invention. By way of example (shown in FIG. 6A), a base station (e.g., destination node 103) and a user equipment (UE) (e.g., source node 101) can communicate in system 600 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 6A:
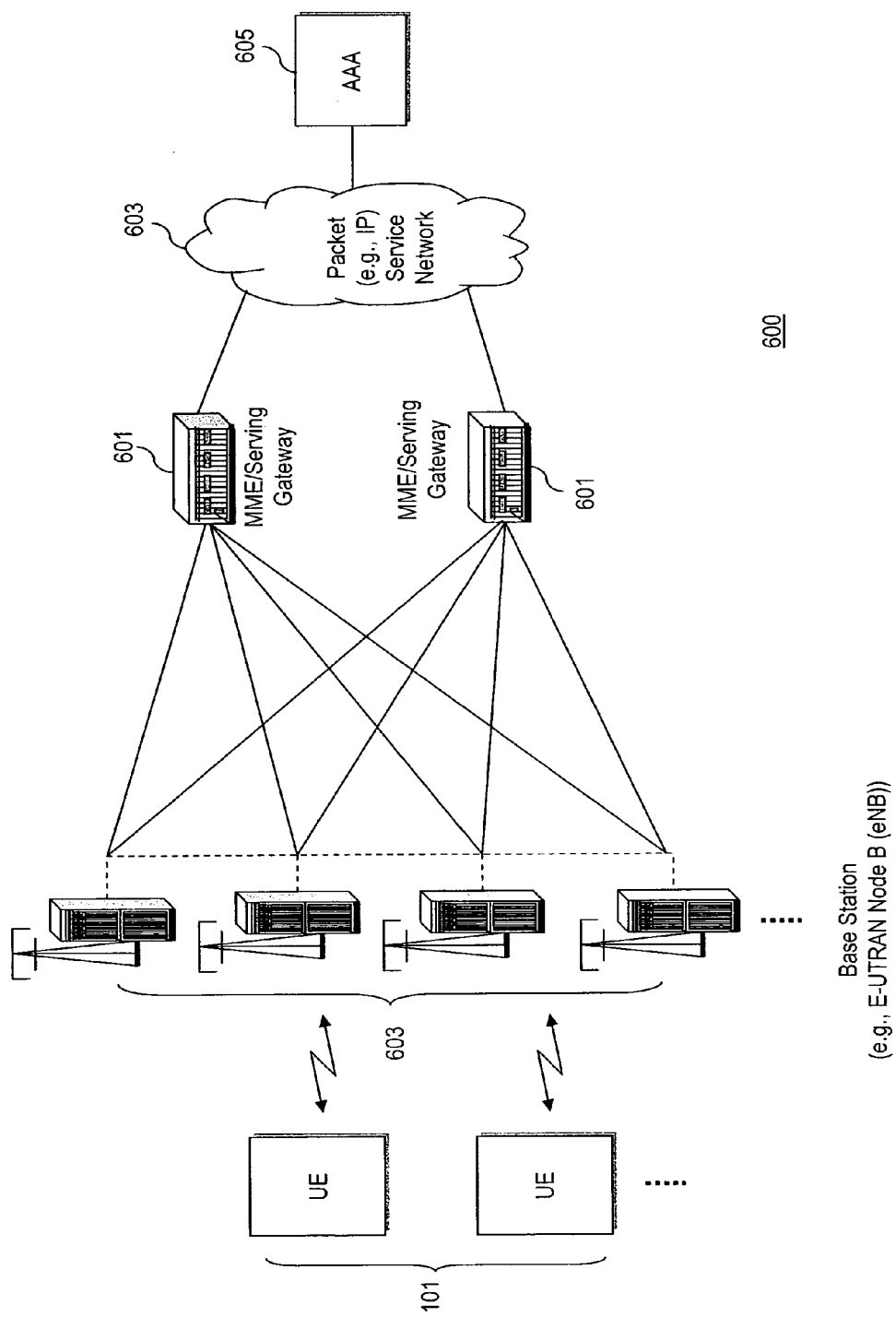
FIGS. 6A-6D are diagrams of communication systems having exemplary long-term evolution (LTE) and E-UTRA (Evolved Universal Terrestrial Radio Access) architectures, in which the system of FIG. 1 can operate, according to various exemplary embodiments of the invention.

The communication system 600 is compliant with 3GPP LTE, entitled "Long Term Evolution of the 3GPP Radio Technology" (which is incorporated herein by reference in its entirety). As shown in FIG. 6A, one or more user equipment (UEs) 101 communicate with a network equipment, such as a base station 103, which is part of an access network (e.g., WiMAX (Worldwide Interoperability for Microwave Access), 3GPP LTE (or E-UTRAN or 8.9G), etc.). Under the 3GPP LTE architecture, base station 103 is denoted as an enhanced Node B (eNB).

MME (Mobile Management Entity)/Serving Gateways 601 are connected to the eNBs 103 in a full or partial mesh configuration using tunneling over a packet transport network (e.g., Internet Protocol (IP) network) 603. Exemplary functions of the MME/Serving GW 601 include distribution of paging messages to the eNBs 103, termination of U-plane packets for paging reasons, and switching of U-plane for support of UE mobility. Since the GWs 601 serve as a gateway to external networks, e.g., the Internet or private networks 403, the GWs 601 include an Access, Authorization and Accounting system (AAA) 605 to securely determine the identity and privileges of a user and to track each user's activities. Namely, the MME Serving Gateway 601 is the key control-node for the LTE access-network and is responsible for idle mode UE tracking and paging procedure including retransmissions. Also, the MME 601 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 6B:
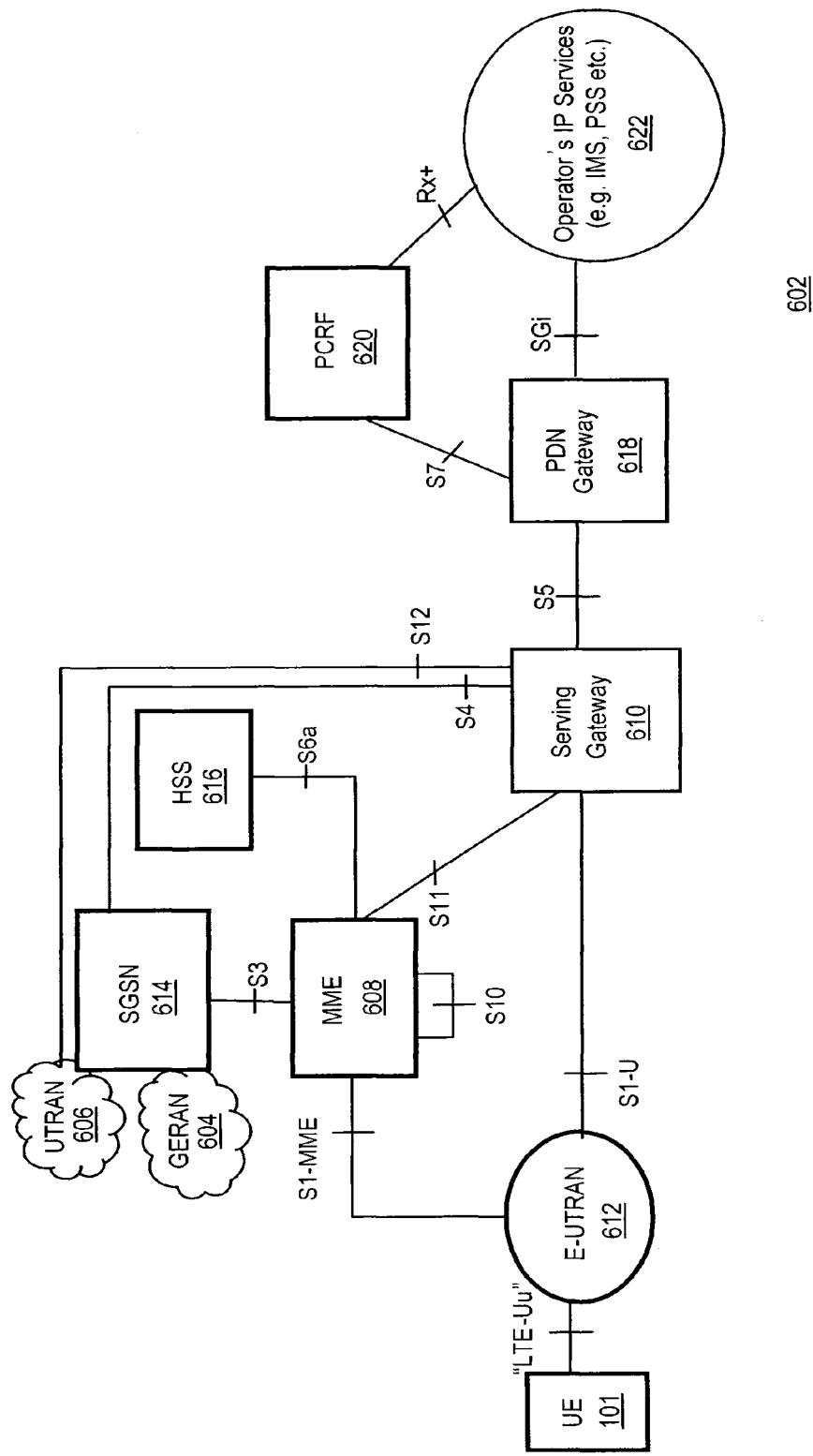

In FIG. 6B, a communication system 602 supports GERAN (GSM/EDGE radio access) 604, and UTRAN 606 based access networks, E-UTRAN 612 and non-3GPP (not shown) based access networks, and is more fully described in TR 23.882, which is incorporated herein by reference in its entirety. A key feature of this system is the separation of the network entity that performs control-plane functionality (MME 608) from the network entity that performs bearer-plane functionality (Serving Gateway 610) with a well defined open interface between them S11. Since E-UTRAN 612 provides higher bandwidths to enable new services as well as to improve existing ones, separation of MME 608 from Serving Gateway 610 implies that Serving Gateway 610 can be based on a platform optimized for signaling transactions. This scheme enables selection of more cost-effective platforms for, as well as independent scaling of, each of these two elements. Service providers can also select optimized topological locations of Serving Gateways 610 within the network independent of the locations of MMEs 608 in order to reduce optimized bandwidth latencies and avoid concentrated points of failure.

As seen in FIG. 6B, the E-UTRAN (e.g., eNB) 612 interfaces with UE 101 via LTE-Uu. The E-UTRAN 612 supports LTE air interface and includes functions for radio resource control (RRC) functionality corresponding to the control plane MME 608. The E-UTRAN 612 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 608, as a key control node, is responsible for managing mobility UE identifies and security parameters and paging procedure including retransmissions. The MME 608 is involved in the bearer activation/deactivation process and is also responsible for choosing Serving Gateway 610 for the UE 101. MME 608 functions include Non Access Stratum (NAS) signaling and related security. MME 608 checks the authorization of the UE 101 to camp on the service provider's Public Land Mobile Network (PLMN) and enforces UE 101 roaming restrictions. The MME 608 also provides the control plane function for mobility between LTE and 2G/3G access networks with the S3 interface terminating at the MME 608 from the SGSN (Serving GPRS Support Node) 614.

The SGSN 614 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 608 and HSS (Home Subscriber Server) 616. The S10 interface between MMEs 408 provides MME relocation and MME 608 to MME 608 information transfer. The Serving Gateway 610 is the node that terminates the interface towards the E-UTRAN 612 via S1-U.

The S1-U interface provides a per bearer user plane tunneling between the E-UTRAN 612 and Serving Gateway 610. It contains support for path switching during handover between eNBs 103. The S4 interface provides the user plane with related control and mobility support between SGSN 614 and the 3GPP Anchor function of Serving Gateway 610.

The S12 is an interface between UTRAN 406 and Serving Gateway 610. Packet Data Network (PDN) Gateway 618 provides connectivity to the UE 101 to external packet data networks by being the point of exit and entry of traffic for the UE 101. The PDN Gateway 618 performs policy enforcement, packet filtering for each user, charging support, lawful interception and packet screening. Another role of the PDN Gateway 618 is to act as the anchor for mobility between 3GPP and non-3GPP technologies such as WiMax and 8GPP2 (CDMA 1X and EvDO (Evolution Data Only)).

The S7 interface provides transfer of QoS policy and charging rules from PCRF (Policy and Charging Role Function) 620 to Policy and Charging Enforcement Function (PCEF) in the PDN Gateway 618. The SGi interface is the interface between the PDN Gateway and the operator's IP services including packet data network 622. Packet data network 622 may be an operator external public or private packet data network or an intra operator packet data network, e.g., for provision of IMS (IP Multimedia Subsystem) services. Rx+ is the interface between the PCRF and the packet data network 622.

Figure 6C:
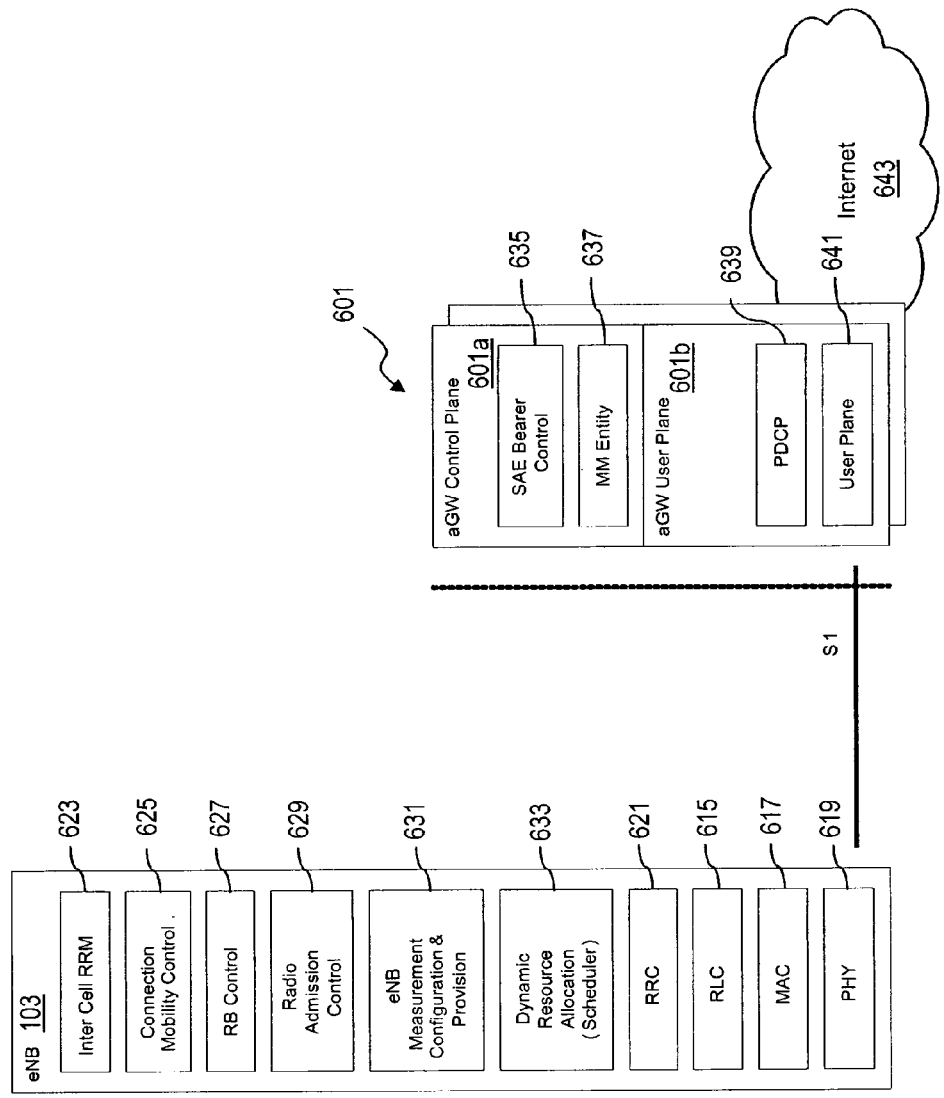

As seen in FIG. 6C, the eNB 103 utilizes an E-UTRA (Evolved Universal Terrestrial Radio Access) (user plane, e.g., RLC (Radio Link Control) 615, MAC (Media Access Control) 617, and PHY (Physical) 619, as well as a control plane (e.g., RRC 621)). The eNB 103 also includes the following functions: Inter Cell RRM (Radio Resource Management) 623, Connection Mobility Control 625, RB (Radio Bearer) Control 627, Radio Admission Control 629, eNB Measurement Configuration and Provision 631, and Dynamic Resource Allocation (Scheduler) 633.

The eNB 103 communicates with the aGW 601 (Access Gateway) via an S1 interface. The aGW 601 includes a User Plane 601a and a Control plane 601b. The control plane 601b provides the following components: SAE (System Architecture Evolution) Bearer Control 635 and MM (Mobile Management) Entity 637. The user plane 601b includes a PDCP (Packet Data Convergence Protocol) 439 and a user plane functions 641. It is noted that the functionality of the aGW 601 can also be provided by a combination of a serving gateway (SGW) and a packet data network (PDN) GW. The aGW 601 can also interface with a packet network, such as the Internet 643.

Figure 6D:
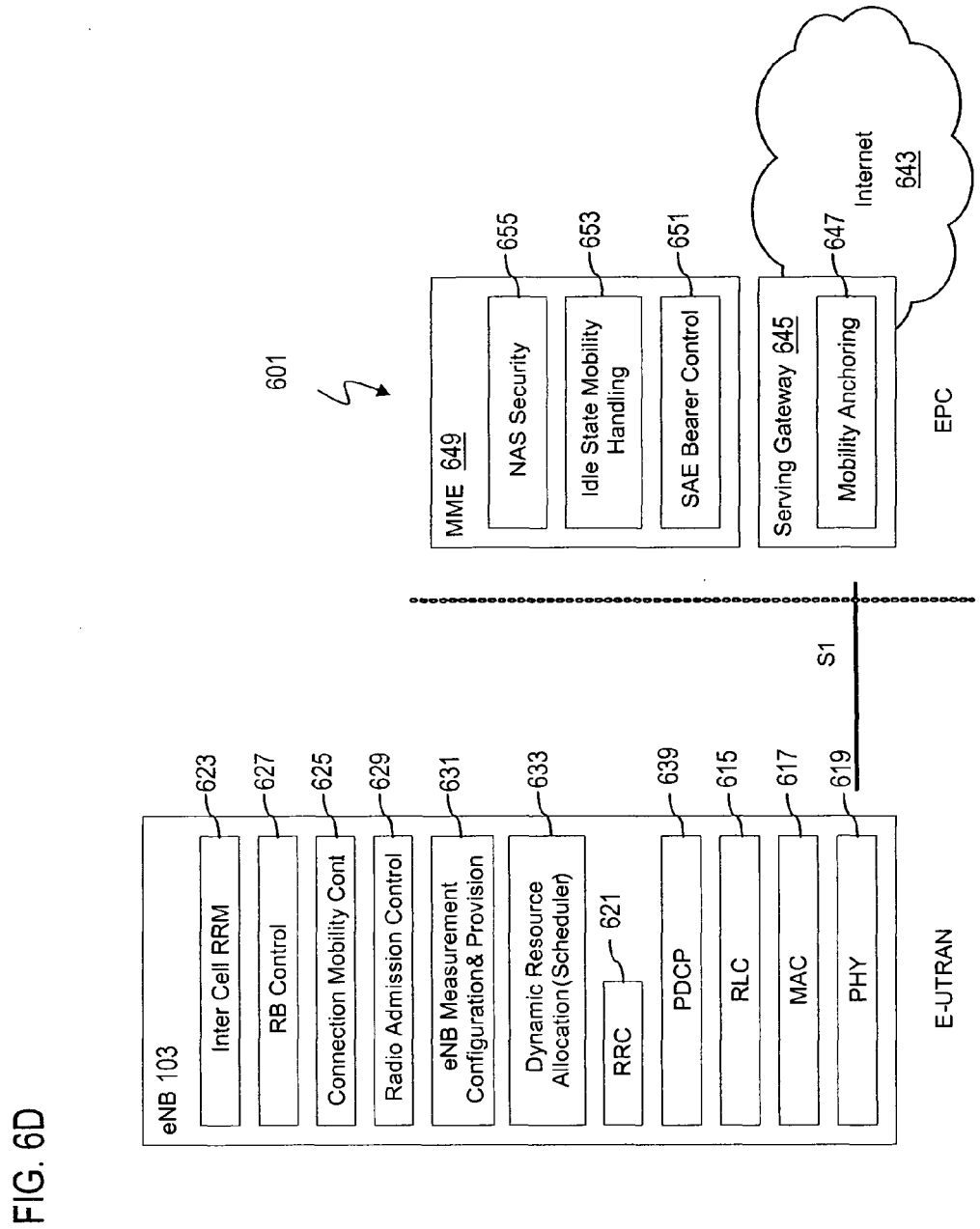

In an alternative embodiment, as shown in FIG. 6D, the PDCP (Packet Data Convergence Protocol) functionality can reside in the eNB 103 rather than the GW 601. Other than this PDCP capability, the eNB functions of FIG. 6C are also provided in this architecture.

In the system of FIG. 6D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 645, which includes a Mobility Anchoring function 647. According to this architecture, the MME (Mobility Management Entity) 649 provides SAE (System Architecture Evolution) Bearer Control 651, Idle State Mobility Handling 653, and NAS (Non-Access Stratum) Security 655.

One of ordinary skill in the art would recognize that the processes for providing frequency reuse may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 7.

Figure 7:
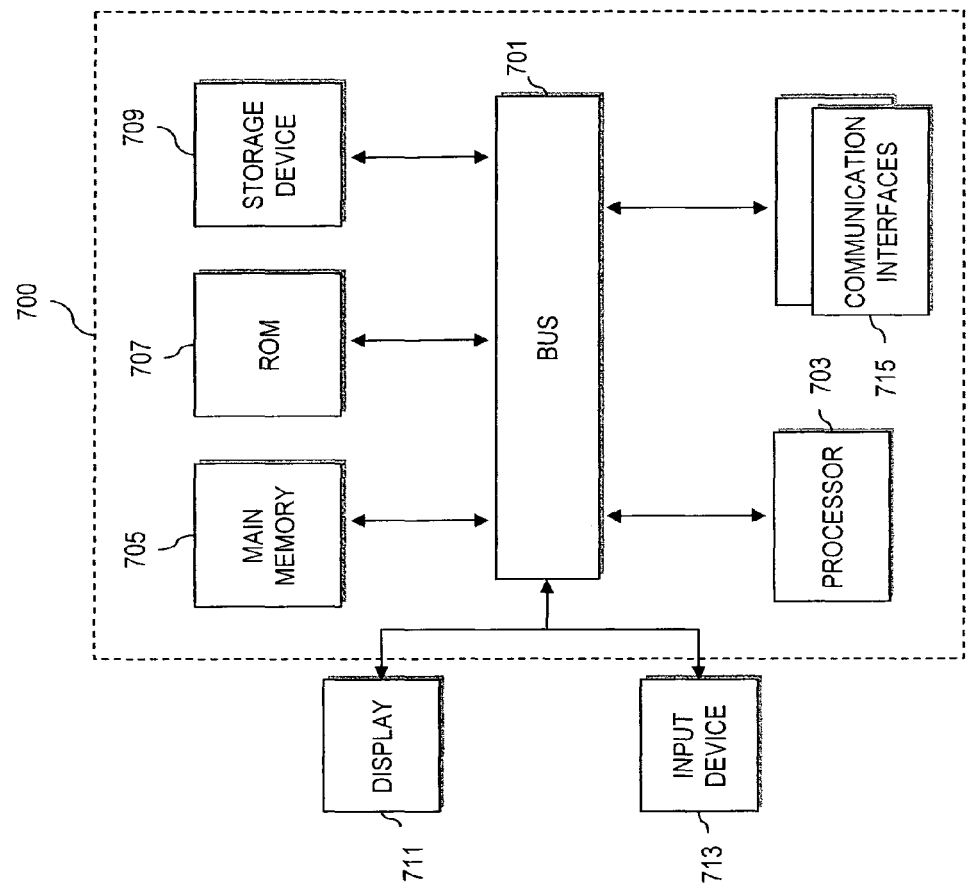
FIG. 7 is a diagram of hardware that can be used to implement an embodiment of the invention.

FIG. 7 illustrates exemplary hardware upon which various embodiments of the invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled with the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to various embodiments of the invention, the processes described herein can be provided by the computing system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
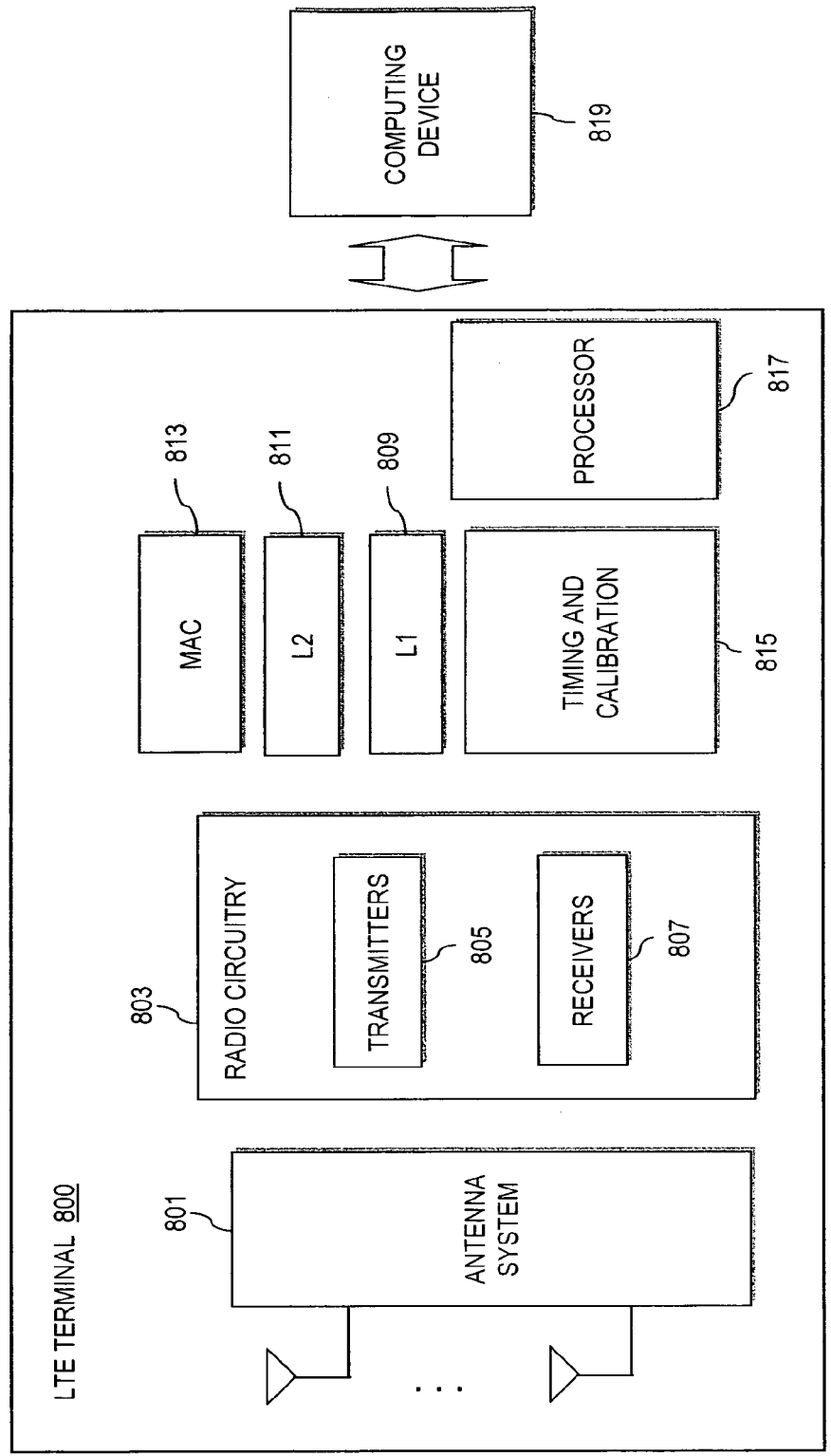
FIG. 8 is a diagram of exemplary components of an LTE terminal capable of operating in the systems of FIGS. 6A-6D, according to an embodiment of the invention.

FIG. 8 is a diagram of exemplary components of an LTE terminal capable of operating in the systems of FIGS. 6A-6D, according to an embodiment of the invention. An LTE terminal 800 is configured to operate in a Multiple Input Multiple Output (MIMO) system. Consequently, an antenna system 801 provides for multiple antennas to receive and transmit signals. The antenna system 801 is coupled to radio circuitry 803, which includes multiple transmitters 805 and receivers 807. The radio circuitry encompasses all of the Radio Frequency (RF) circuitry as well as base-band processing circuitry. As shown, layer-1 (L1) and layer-2 (L2) processing are provided by units 809 and 811, respectively. Optionally, layer-3 functions can be provided (not shown). Module 813 executes all MAC layer functions. A timing and calibration module 815 maintains proper timing by interfacing, for example, an external timing reference (not shown). Additionally, a processor 817 is included. Under this scenario, the LTE terminal 800 communicates with a computing device 819, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
allocating bandwidth in a radio network utilizing a plurality of cells among a plurality of fractionally overlapped channel bandwidths across said cells for providing communication over said radio network, wherein said cells are grouped for frequency assignment;
assigning different values of center carrier frequencies to groups of said cells for partial transmission overlap depending on the bandwidth allocation, the bandwidth allocation being frequency offset based on the center carrier frequencies, wherein the different values are set to vary frequency reuse over the allocated bandwidth;
determining frequency shift for using offset of the allocated bandwidth to support frequency reuse; and
selecting an optimal degree of frequency shift according to the different values of the center carrier frequencies.

2. The method according to claim 1, further comprising:
signaling the offset to a user equipment over either a synchronization channel or a broadcast channel to provide intra-frequency mobility.

3. The method according to claim 2, wherein the synchronization channel is arranged according to intra-frequency mobility conditions irrespective of the frequency offset for the center frequency.

4. The method according to claim 1, wherein the assignment of the center carrier frequencies provides partial overlap for spectrums of transmissions.

5. The method according to claim 1, wherein the radio network complies with a long term evolution (LTE)-compliant architecture.

6. The method according to claim 1, wherein the center frequencies are assigned to arrange spacing according to granularity of resource blocks (RB).

7. A non-transitory computer-readable storage medium carrying one or more sequences of one or more instructions which, when executed by one or more processors, cause the one or more processors to perform the method of claim 1.

8. An apparatus comprising:
a computer program product comprising a non-transitory computer-readable medium bearing computer program code embodied therein for use with a computer, the computer program code comprising:
logic configured to allocate bandwidth in a radio network utilizing a plurality of cells among a plurality of fractionally overlapped channel bandwidths across said cells for providing communication over said radio network, wherein said cells are grouped for frequency assignment,
the logic being further configured to assign different values of center carrier frequencies to groups of said cells for partial transmission overlap depending on the bandwidth allocation, the bandwidth allocation being frequency offset based on the center carrier frequencies, wherein the different values are set to vary frequency reuse over the allocated bandwidth, and
wherein the logic is further configured to determine frequency shift for using offset of the allocated bandwidth to support frequency reuse, and to select an optimal degree of frequency shift according to the different values of the center carrier frequencies.

9. The apparatus according to claim 8, further comprising:
a transceiver configured to signal the offset to a user equipment over either a synchronization channel or a broadcast channel to provide intra-frequency mobility.

10. The apparatus according to claim 9, wherein the synchronization channel is arranged according to intra-frequency mobility conditions irrespective of the frequency offset for the center frequency.

11. The apparatus according to claim 8, wherein the assignment of the center carrier frequencies provides partial overlap for spectrums of transmissions.

12. The apparatus according to claim 8, wherein the radio network complies with a long term evolution (LTE)-compliant architecture.

13. An apparatus comprising:
a transceiver configured to transmit within one of a plurality of cells of a radio network utilizing a plurality of cells, wherein the cells are grouped for frequency assignment according to a frequency reuse scheme that assigns different values of center carrier frequencies for the respective groups of said cells for partial transmission overlap depending on a bandwidth allocation, the bandwidth allocation being frequency offset based on the center carrier frequencies, wherein the different values are set to vary frequency reuse over said allocated bandwidth within the radio network, and
wherein a frequency shift is determined for using offset of the allocated bandwidth to support the frequency reuse scheme, an optimal degree of frequency shift is selected according to the different values of the center carrier frequencies.

14. The apparatus according to claim 13, wherein the transceiver is further configured to receive the offset over either a synchronization channel or a broadcast channel to provide intra-frequency mobility.

15. The apparatus according to claim 14, wherein the synchronization channel is arranged according to intra-frequency mobility conditions irrespective of the frequency offset for the center frequency.

16. The apparatus according to claim 13, wherein the assignment of the center carrier frequencies provides partial overlap for spectrums of transmissions.

17. The apparatus according to claim 13, wherein the apparatus is a user equipment.

* * * * *